United States Patent
Streng et al.

(10) Patent No.: US 8,124,018 B2
(45) Date of Patent: Feb. 28, 2012

(54) MODULAR DEVICE FOR THE CONTINUOUS DEGASSING AND PRODUCTION OF POLYMER PRECONDENSATE WITH HIGH REACTION PRODUCT SURFACE TO VOLUME RATIO WITH GENTLE TREATMENT OF THE REACTION PRODUCT MASS

(75) Inventors: Michael Streng, Maintal (DE); Clifford Schaeferskuepper, Saalfeld (DE); Stephan Biller, Gruendau (DE); Andreas Hilpert, Gelnhausen (DE)

(73) Assignee: EPC Industrial Engineering GmbH, Alzenau (DE)

(*) Notice: Subject to any disclaimer, the term of this patent is extended or adjusted under 35 U.S.C. 154(b) by 820 days.

(21) Appl. No.: 11/909,611

(22) PCT Filed: Mar. 22, 2006

(86) PCT No.: PCT/EP2006/002832
§ 371 (c)(1),
(2), (4) Date: Sep. 19, 2008

(87) PCT Pub. No.: WO2006/100105
PCT Pub. Date: Sep. 28, 2006

(65) Prior Publication Data
US 2009/0047186 A1 Feb. 19, 2009

(30) Foreign Application Priority Data
Mar. 22, 2005 (DE) .......................... 10 2005 013 764

(51) Int. Cl.
*B01J 19/24* (2006.01)
*B01J 3/02* (2006.01)
*B01J 14/00* (2006.01)

(52) U.S. Cl. ....... 422/131; 422/134; 422/138; 159/13.1; 159/18

(58) Field of Classification Search .................. 422/131, 422/134, 138; 159/13.1, 18
See application file for complete search history.

(56) References Cited

U.S. PATENT DOCUMENTS

| | | | |
|---|---|---|---|
| 2,727,882 A | 12/1955 | Vodonik | |
| 3,054,776 A | 9/1962 | Higgins | |
| 3,251,657 A | 5/1966 | Bachmann et al. | |
| 3,359,074 A | 12/1967 | Dobo | |
| 3,390,965 A | 7/1968 | Bachmann et al. | |
| 3,620,283 A * | 11/1971 | Brown | 159/13.2 |
| 3,651,125 A * | 3/1972 | Lewis et al. | 560/92 |
| 4,158,092 A * | 6/1979 | Botsch et al. | 428/500 |
| 4,289,895 A | 9/1981 | Burkhardt et al. | |
| 5,310,955 A | 5/1994 | Shirtum et al. | |

FOREIGN PATENT DOCUMENTS

| | | |
|---|---|---|
| DE | 10155419 | 5/2003 |
| FR | 1357905 | 4/1964 |

* cited by examiner

*Primary Examiner* — Jennifer A Leung
(74) *Attorney, Agent, or Firm* — Fish & Richardson P.C.

(57) ABSTRACT

A modular device for the continuous degas sing of reaction products, such as of a carboxylic acid or a polycarboxylic acid with a multi-functional alcohol suitable for application in the production of precondensates (or also prepolymers), has a heated enclosure in which a plurality of modules are stacked one above the other, each said module having a base. There is a vapor inlet to the uppermost module and a discharge port at the lower most module with at least one module intermediate the uppermost and lowest modules to provide space for expansion of the vapor. The base of each module preferably is concave and there are conduits that provide flow communication between the modules.

4 Claims, 1 Drawing Sheet

PREPOLYMER CONDENSATION

MODULAR DEVICE FOR THE CONTINUOUS DEGASSING AND PRODUCTION OF POLYMER PRECONDENSATE WITH HIGH REACTION PRODUCT SURFACE TO VOLUME RATIO WITH GENTLE TREATMENT OF THE REACTION PRODUCT MASS

FIELD OF THE INVENTION

The invention relates to a reactor (modular device), which can be used for the continuous degassing of reaction products of a carboxylic acid or dicarboxylic acids with a multihydric alcohol employed for the production of pre-condensates (or also of pre-polymers), in which reactor a higher ratio of surface area to volume of the product is to be attained, which is proportional to producing the intrinsic viscosity (IV) of the product of 0.2 to 0.35 dL/g and which permits a thermally and mechanically gentle treatment of this reaction composition, according to the distinguishing features in the introductory portion of the main claim.

BACKGROUND OF THE INVENTION

Reactors, having the configuration of containers with stirrers, are known. However, the ratio of the surface area to the volume of the product is poor in such reactors. Only a limited build up of intrinsic viscosity is possible here. Moreover, for this type of reactor, a high input of energy is required. The configuration of the heating system is expensive in this case, the surface area, required for degassing the product, being produced only inadequately by the stirrer. There is no possibility of subsequently expanding the reaction space in order to increase the output of the reactor and, accordingly, to raise the capacity of the installation and/or of the production.

The use of containers with special stirring mechanisms also proves to be disadvantageous. The manipulation of the product, required for producing the necessary reaction surface area, is complicated from a production engineering point of view and the special construction, resulting therefrom, is expensive. The stirring mechanism, additionally used for producing the highest possible surface area, has the disadvantages described above. For these reactors also, a high energy input is necessary. The configuration of the heating proves to be very expensive.

The DE 10155419 A1 discloses a "Method for the continuous production of high molecular weight polyester as well as a device for carrying out the method". The reaction and the production of surface area take place in the tower reactor described by means of a falling film evaporator.

The use of a falling film evaporator represents a difficulty in case of a breakdown, since the pipes of the falling film evaporator may become blocked with thermally degraded material. Moreover, a tower reactor is a complicated and, with that, an economically expensive construction.

The U.S. Pat. No. 5,310,955 A discloses a vertical reactor system, in which the reaction mixture passes from the top to the bottom through different cylindrical compartments and mixing is accomplished by a stirring mechanism. The sealing of the individual compartments, which are connected by the shaft of the stirring mechanism, turns out to be difficult. On the one side, mixing of the reaction material is improved by the stirring mechanism itself. However, the reactive surface area is increased only to a very limited extent. The unfavorable diameter to height ratio of the individual compartments also comes to bear here.

The U.S. Pat. No. 4,289,895 (DE 2504258) discloses a method for producing oligomeric alkene terephthalates. A device is described here, in which the reaction takes place in several stirred cylindrical chambers, which are disposed on top of one another and some of which are stirred. Moreover, each chamber has a separate heating system. In the upper part, the reaction takes place under pressure, whereas, in the lower part, a vacuum is applied.

For this device also, there is an unfavorable ratio of diameter to height in the vacuum area, the reactive surface area generated being small in relation to the capacity. The stirring mechanisms are also concerned only with thorough mixing and not with producing the required reactive surface area. The individual heating systems for each chamber make the device very expensive.

Horizontal reactors are equipped with a cumbersome stirring mechanism for generating surface area. In the course of time, the mechanical stresses on the seal, which develop at the shaft ducts, result in leaks, which may lead to the entry of oxygen from the air into the reaction space, which is harmful for the product.

BRIEF DESCRIPTION OF THE INVENTION

It is an object of the invention to provide a device, with which an optimally high ratio of the surface area to the volume of the product is achieved, which ensures high degassing of the product. Furthermore, it shall be possible to carry out the process without using a stirring mechanism, so that the reactor can be operated maintenance-free. The reactor shall be of modular construction, so that the greatest possible standardization of the reactor can be achieved. The modular construction and simple design permit an efficient effort and a cost-effective design. Due to the modular construction, reactors, which are too large to be transported, can be installed on site. Likewise, an expansion of capacity can be achieved without any new installations, in that the installed reactor is enlarged by the use of further modules.

BRIEF DESCRIPTION OF THE DRAWINGS

Other objects and advantages of the present invention will become more apparent upon reference to the following specification and drawings in which.

DETAILED DESCRIPTION OF THE INVENTION

Figure 1:
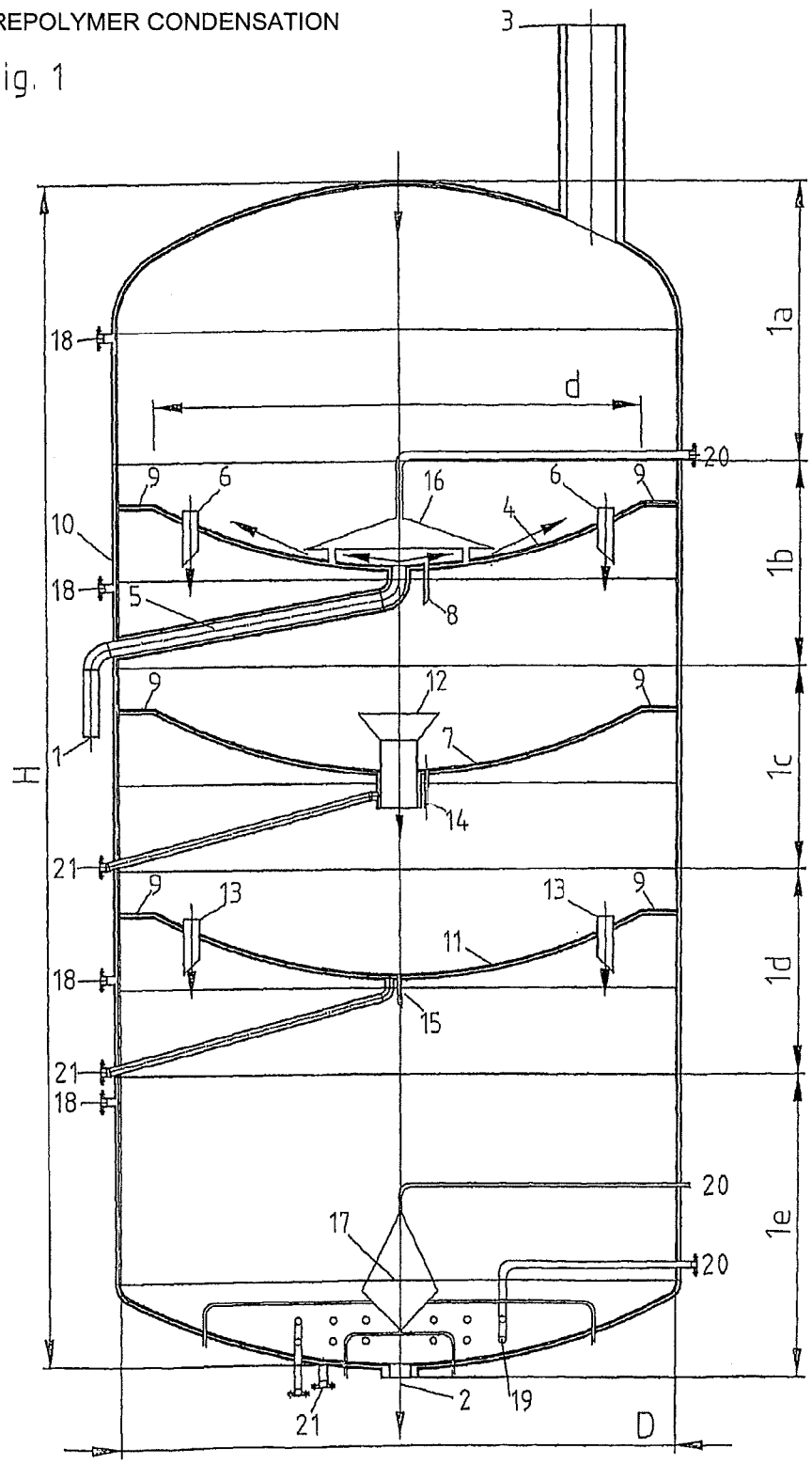
FIG. 1 is an elevational, schematic view of the invention in cross- section.

1. The device or reactor consists of at least 3 basic modules (1a, 1b and 1c, see sketch, FIG. 1). Each of these basic modules is represented only once in the reactor and fulfills the function of product entry (1b), product bottom with product discharge (1e) and of vapor collection and vapor discharge (1a). A high specific product surface area, measured at by the product volume, is generated.

The expansion modules (1c and 1d) serve to generate additional surface area. The expansion modules are used if a higher installation throughput is to be achieved while the reactor diameter is kept constant. The reaction surface area, required for this purpose, is produced by installing the expansion modules. In the construction of the reactor, the basic module (1b) is followed by the expansion module (1c). The expansion module (1c) is followed by the expansion module (1d). If more expansion modules are required, expansion modules 1c and 1b alternate with one another until the required number of expansion modules is attained.

2. The bases of the modules 1b, 1c and 1d have a defined arched shape. Openings formed for the connecting pieces of the inlets, overflows and outlets are constructed and placed so that dead spaces are avoided.

3. The overflow pipes (6, 12, 13) on the bases of the modules 1b, 1c and 1d are dimensioned so that the product, after overflowing from the product surface into the overflow pipe, forms a defined, fully formed film at the inner wall of the overflow pipe. By these means, further product surface area is generated and mass transfer is improved by the flow of vapors in the core space of the overflow pipe.

4. The diameter d of the bases of the modules 1b, 1c and 1d is smaller than the diameter D of the reactor enclosure. In this way, a peripheral edge region is formed outside of the periphery of the base and serves as a flow channel for the vapors. The edge regions are dimensioned, so that a sufficiently high vapor velocity is achieved, which leads to self-cleaning of the reactor with regard to product adhesions at the reactor walls or cleans off adhesions formed by carrying them along.

5. The bases of the modules 1b, 1c, 1d and the reactor enclosure with the connecting pieces for the exit of vapor and product are equipped with heaters, which, if necessary, can be controlled separately. The heater introduces the necessary process energy. Should they occur, wall deposits are prevented by heating the wall and cleaned off in combination with the high vapor velocity.

6. The fresh pre-product (1), entering the module 1b from the prior step of the reaction, is pre-distributed by a distributing device (16) transversely to the entry direction. Depending on the type of product entering, this distributing device (16) is equipped with a heating system. The distributing device (16) reliably feeds the product below the surface, the reaction thus commencing in module 1b, and prevents premature excessive overflow of the product into the vapor space.

7. The flow of end product, emerging from the base module 1e, is affected by a displacer device (17) so that the finished product melt does not achieve a preferred core outlet flow and, accordingly, there is still a sufficient transverse exchange of materials from the outer diameter of the module to the central outlet point.

8. The reactor is heated with steam as a heat transfer medium, which is supplied to the outer jacket of the reactor over one or more steam inlet connecting pieces (18). The steam, acting as a heat transfer medium, can be supplied to the double jacketed bases (9) on the inside over this outer jacket. The condensate, formed during the heat transfer process, drains, in the case of module 1b, over the double jacket of the product entry pipeline (1) and, in a case of modules 1c and 1d through a condensate return pipeline (21) leading from the inside to the outside. The displacer device (17), provided in the base 1e, as well as the associated heating coil (19), is heated over the steam inlet pipelines (20).

The heat transfer medium condensate drains through the connection with the heating jacket of the base of the module 1e and emerges from the heating jacket over one or more condensate pipeline connections (22).

The invention has the following advantages:
1. The reactor is of modular construction, permitting it to be produced effectively in a standardized manner. Likewise, the capacity of installed reactors, when necessary, can be increased by using modules 1c and 1d. By these means, economically highly efficient effects are opened up.
2. By the structural configuration of the bases of the modules 1b, 1c and 1d and their arrangement relative to one another, effective mixing of the product can be achieved, as reflected in a highly efficient generation of product surface area, measured by the product volume. Degassing of the product is improved as a result of the greater exchange of material, bought about by the enlarged material transfer surface area.
3. The reactor is distinguished by a simple configuration and construction with minimized manufacturing costs.
4. Surfaces, on which product or product melt deposits, are prevented all around by the structural configuration and the heating of the surfaces and vapor leadthroughs.
A self-cleaning effect of the reactor is ensured.
5. The reactor has no stirring mechanism. There are no leaks and there is no penetration of oxygen from the air at shaft leadthroughs. Accordingly, a potential drop in quality due to oxidative damage to the product is precluded.

The inventive device is explained more extensively in the following example. Details are given in the. FIG. 1 shows an overall view of the reactor.

The ratio of the reactive surface area of the product to the volume existing in the reactor is of decisive importance for the kinetics of the polycondensation process. The larger the product surface area and the lower the layer height that is acted upon with vacuum, the more selective and more rapid is the reaction that takes place. For this reason, every effort is made to create the largest possible, effective surface area, which is exposed to the vacuum, in the pre- polycondensation and polycondensation reactors.

The pre-polycondensation reactor, described by way of example, comprises five individual modules 1a to 1e. Each module is heated with thermaoil in the wall area as well as in the base areas to the temperature necessary for the reaction. By heating the whole reactor homogeneously, adhesions of material, such as those that may occur at relatively cold places, are prevented.

In detail, the modules 1 are:
1. the product bottom 1e, in which the surface area and the residence time are generated, with the product delaying 2, through which the product is discharged into the next step of the process,
2. two base sections 1c and 1d, in which further surface area is generated and from which the material overruns downward,
3. an inlet base 1b, over which the product from the preceding step enters the reactor and
4. the vapor space 1a.

The vapors are combined in the vapor space 1a. The vapors leave the reactor through the vapor pipeline (3). The vacuum, existing in the product space of the reactor, is produced by a downstream vacuum installation. The product space of the reactor is connected by the vapor pipeline (3) with this vacuum installation. Due to the wall effect of the vapors, which will be described in greater detail in the following, a self-cleaning effect of the reactor sets in.

In the product entry base (4), which adjoins below the vapor space 1a, the product enters below the level or below the floor, centrally, over a heated product pipeline (5) and is distributed with the help of the product distributing device (16) on the product entry base (4). On a defined, circular periphery, the product entry base (4) is provided with overflows (6), over which the product runs to the following base (7). The overflows (6) are constructed so that the product is guided efficiently and dead spaces (areas, through which there is no flow) are avoided. Aside from the overflows (6), this base has a low point drain (8), which also passes product to the next base (7). Like that of all other bases, the diameter of the product entry base (4) is smaller than that of the reactor enclosure (10). This results in a free edge region (9) above the product level. The vapors are passed through this free edge region (9, in order to attain the self-cleaning effect of the reactor. The area of the free edge regions (9) is dimensioned so that the vapors have a velocity, which avoids depositing material on the reactor enclosure (10) and cleans (carries along) any deposits.

The construction of the next two bases (7 and 11) is basically similar to that of the production entry base (4). However, deviating from the production entry base (4), these have only overflows (12 and 13) for the product on to the next base or into the reactor bottom. These bases also have a low point drain (14 and 15). As in the product entry base (4), the product is also conducted to the subsequent base in such a manner that it is always passed from the outer regions to the centrally disposed overflow (12) in the base (7) and then again to the overflows (13) on the defined circle of the base (11) (analogous to the product entry base (4)). As already in the case of the product entry base (4), so also in the case of the subsequent bases (7 and 11) the vapors are passed through the free edge region (9) into the vapor space. With these bases also, the area of the free edge region (9) is dimensioned so that the vapors have so high a velocity, that material cannot deposit on the reactor enclosure and any deposits are cleaned off (carried along). With that, the self-cleaning effect is guaranteed here also.

The product is withdrawn centrally through connecting pieces (2) from the product bottom and supplied to the next production step. The product bottom in the module is constructed with a heated displacer devise (17) for an optimized transverse flow distribution, the incoming and outgoing heat transfer pipelines of which serve for holding, by means of which however, also in the case of a malfunction, solidified (frozen) residual material in the product base can be melted. Furthermore, the product base in 1*e* is dimensioned so that, in case of a stoppage or a malfunction, it can take up the whole of the product volume in the reactor, without any overflow into the module disposed above.

The invention claimed is:

1. A device for the continuous degassing and production of polymeric pre-condensates to produce a higher ratio of surface area to volume of the product during processing, comprising:
   a heated enclosure;
   a plurality of modules stacked one above the other in said enclosure, each said module having a base;
   an inlet of vapor through said enclosure to the uppermost module of said plurality of modules in which said vapors are collected;
   at least one conduit in the base of each module to provide vapor flow communication to the module below it with the conduit at the base of the lowest module in the stack providing an outlet; wherein at least one said module intermediate said uppermost module and said lowest module provides space for expansion of the vapor flowing through said at least one conduit, the base of each said module of said plurality of modules is concave, and each said concave base starts from a flat peripheral edge portion extending from the interior of said enclosure.

2. The device of claim 1, wherein said inlet is through said enclosure into a module below said uppermost module, and further comprising a vapor dispersion element at the base of said uppermost module for dispersion of the vapor into said uppermost module.

3. The device of claim 1, wherein the said concave bases each have a diameter d, that is, 70 to 99% of the diameter D of the heated enclosure so that said peripheral edge portion provides a region for the flow of vapors along the enclosure dimensioned so that high vapor velocities arise to provide a self-cleaning effect of the enclosure.

4. The device of claim 3, wherein an overflow outlet conduit is configured and dimensioned so that the overflowing product forms a falling film at its inner surface and has a central gas space that acts for material transfer and as a flow channel for the vapors.

* * * * *